United States Patent [19]

Pensabene et al.

[11] 4,166,010

[45] Aug. 28, 1979

[54] SINTERED NEGATIVE PLATE

[75] Inventors: Saverio F. Pensabene; Arthur J. Catotti, both of Gainesville, Fla.

[73] Assignee: General Electric Company, Gainesville, Fla.

[21] Appl. No.: 970,316

[22] Filed: Dec. 18, 1978

Related U.S. Application Data

[63] Continuation-in-part of Ser. No. 894,398, Apr. 7, 1978, Pat. No. 4,139,423.

[51] Int. Cl.$^2$ .......................... C25D 9/06; C25D 9/08
[52] U.S. Cl. ..................................................... 204/2.1
[58] Field of Search ................. 204/2.1; 427/437, 126, 427/380

[56] References Cited

U.S. PATENT DOCUMENTS

| | | | |
|---|---|---|---|
| 3,663,296 | 5/1972 | Nervik | 427/437 |
| 3,679,481 | 7/1972 | Pinard | 427/126 |

*Primary Examiner*—T. M. Tufariello

[57] ABSTRACT

A process for manufacturing electrodes for nickel-cadmium alkaline storage cells consisting essentially of the steps of forming a porous nickel plaque, immersing the plaque in a slightly acidic-cadmium nitrate solution, removing the plaque from the solution and heating the plaque in air until dry, immersing the dried plaque in an alkali hydroxide solution, removing the plaque from the hydroxide solution and rinsing the plaque with water, reheating the plaque in air until substantially dry, repeating the foregoing treatments until the desired electrochemical loading in the plaque pores is attained, heating the plaque with the desired electrochemical pore loading to a temperature of between about 200° C. and 300° C. until substantially all of the Cd(OH)$_2$ in the plaque is converted to CdO and nitrate impurities in the plaque are converted to nitrogen oxide gases and volatized, immersing the plaque with the converted CdO in a second alkali hydroxide solution, cathodizing the plaque in the second solution until about 20–40% of the CdO therein is converted to Cd, removing the cathodized plaque from the second solution, rinsing the plaque with water and heating the rinsed plaque until the plaque is substantially dry.

7 Claims, No Drawings

SINTERED NEGATIVE PLATE

This application is a continuation-in-part of application Ser. No. 894,398, filed Apr. 7, 1978, now U.S. Pat. No. 4,139,423 and relates to an improved process for the preparation of storage battery electrodes, particularly, for the preparation of negative electrodes for nickel-cadmium alkaline storage cells.

It is known that nitrate ion contamination adversely affects the charge retention capacity of nickel-cadmium alkaline storage cells, accelerates loss of charge and shortens the charge retention life thereof. In nickel-cadmium cells, where the electrolyte availability in the cell is limited, the nitrate ion reaction lowering the cell charge retention can be substantial.

In application Ser. No. 894,398, there is disclosed and described a process for lowering the nitrate ion level in nickel-cadmium alkaline cells wherein the composite in the make-up of the negative electrode or plate is treated in a particular manner as such composite is formed on the electrode or plate. In such process, the composite is heated under prescribed conditions after the composite has been built to the desired electrochemical capacity on the electrode or plate and before such composite electrode or plate undergoes initial electrochemical reaction. Thus, in such process, the composite is built to its desired electrochemical capacity and is then heated in air to a temperature not substantially less than 200° C. and not substantially more than 300° C. until the $Cd(OH)_2$ in such composite is converted to CdO and the nitrate impurities are converted to nitrogen oxide gases and volatized. Once all of the $Cd(OH)_2$ has been converted to CdO, the temperature can be raised to between about 400° C. and 500° C. to convert any $Ni(OH)_2$ in the composite to NiO and volatize any nitrates remaining in the composite. After the composite has been heated, the $Cd(OH)_2$ converted to CdO and the nitrate impurities have been converted to nitrogen oxide gases and driven off, the heat treated composite in the process in said application is immersed in an alkali hydroxide solution, preferably sodium hydroxide, and cathodized to convert CdO to Cd and then anodized to oxidize the Cd to $Cd(OH)_2$ leaving about 70-80% $Cd(OH)_2$ in the composite and about 20-30% of the material in the form of Cd. The electrode or plate is then immersed in water to remove any alkali hydroxide remaining and is heated in air until dry.

In the instant invention it has been discovered that anodization of the composite in the alkali hydroxide solution can be completely eliminated and that cathodization of the composite can be substantially reduced without adversely affecting the charge retention capacity of the cell. Furthermore, it has been discovered that by substantially reducing the cathodization of the composite and by eliminating anodization the space heretofore required for cathodization and anodization can be substantially reduced, the electrochemical energy heretofore required can be substantially reduced and that the need for handling large volumes of hydrogen and caustic mist, and the inherent hazards and dangers therein, are eliminated. The environmental air control load and the facilities and space required for air handling equipment is substantially reduced.

In the instant invention it has been discovered that only about 50% of the space required by the process of the aforesaid application for cathodization and anodization is required in the instant process where anodization is eliminated and cathodization is reduced. Furthermore, more than 80% of the electrochemical energy heretofore required in the process of the aforementioned application is saved in the process of the instant invention. Only about 1/10 to 1/15 of the gases produced during the cathodization/anodization process of such application are produced in the instant process. The gases which the instant process does produce are mostly oxygen further adding to the savings in handling of the gases produced.

It has been discovered, in the instant invention, that the cathodic conversion of the CdO to Cd in the composite, after the composite has been heated in air and the $Cd(OH)_2$ has been converted to CdO and the nitrates to gases and driven off, can be substantially reduced and the anodization of the composite can be completely eliminated without sacrifice to the charge retention capacity of cells produced with such composite. Thus, rather than converting all of the CdO in the composite to Cd and then reconverting 70-80% of the Cd to $Cd(OH)_2$, as in the process of the prior application, in the process of the instant invention only about 20-40% of the cadmium containing material is converted to Cd. The substantial savings in electrical energy, space and air handling equipment is effected without substantially lowering the retention capability of cells produced therein. Indeed, as comparative tests show, performance is improved.

Negative plates were prepared by the process of application Ser. No. 894,398 and by the process of the instant invention and were built with positive plate and separators into cells of ⅓ A design and were grouped and tested.

Sintered nickel plaques were prepared in conventional manner and were loaded with electrochemical active metal hydroxides to form negative plates in accordance with the disclosure of application Ser. No. 894,398 by the following sequence of steps:

(a) immersing of the sintered nickel plaque in cadmium nitrate solution;

(b) heating the plaque in air until substantially dry;

(c) immersing the dried plaque in sodium hydroxide solution;

(d) immersing the plaque in water;

(e) heating the plaque in air until substantially dry;

[steps (a)–(e) were repeated, in seriation, until the desired electrochemical capacity of the plaque was attained];

(f) the plaque, with the desired electrochemical capacity, was heated to a temperature of between 200°–300° C. until the $Cd(OH)_2$ therein was converted to CdO and the heating temperature was then raised and maintained at a temperature between 400°–550° C. until the $Ni(OH)_2$ in the plaque was converted to NiO;

(g) the plaque from steps (f) was next immersed in sodium hydroxide, was cathodized to convert substantially all of the CdO in the plaque to Cd and was then anodized to oxidize and reconvert sufficient of the Cd to $Cd(OH)_2$ so that the composite contained about 70–80% $Cd(OH)_2$ and about 20–30% Cd;

(h) the cathodized and anodized plaque was next immersed in water;

(i) the plaque was heated in air until substantially dry;

(j) the dried plaque was cut into plate size and assembled, in conventional manner, with separators, positive plates and conventional component into ⅓ A design cells. (Unmodified Cells).

Plaques were prepared in accordance with the process of the instant invention by repeating, in seriation, steps (a) through (f), supra, except that, in step (g) the plaque immersed in sodium hydroxide was cathodized until about 20-40% of the CdO was converted to Cd. Cathodization was then stopped. There was no anodization.

Thus, sintered nickel plaques were prepared and were loaded with electrochemical active metal hydroxide to form negative plates in accordance with the invention of the instant application by the following sequence of steps:
  (a) immersing of the sintered nickel plaque in cadmium nitrate solution;
  (b) heating the plaque in air until substantially dry;
  (c) immersing the dried plaque in sodium hydroxide solution;
  (d) immersing the plaque in water;
  (e) heating the plaque in air until substantially dry;
  [steps (a)-(e) were repeated, in seriation, until the desired electrochemical capacity of the plaque was attained];
  (f) the plaque, with the desired electrochemical capacity, was heated to a temperature of between 200°-300° C. until the $Cd(OH)_2$ therein was converted to CdO and the heating temperature was then raised and maintained at a temperature between 400°-550° C. until the $Ni(OH)_2$ in the plaque was converted to NiO;
  (g) the plaque from step (f) was next immersed in sodium hydroxide and cathodized until about 20-40% of the CdO therein was converted to Cd;
  (h) the cathodized plaque was next immersed in water;
  (i) the plaque was heated in air until substantially dry;
  (j) the dried plaque was cut into plate size and assembled, in conventional manner, with separators, positive plates and conventional component into ⅓ A design cells. (Modified Cells).

The cells assembled with negative plates processed, aforesaid, in accordance with the process of application Ser. No. 894,398 (Unmodified Cells) and the cells assembled with the negative plates processed in accordance with the present invention, (Modified Cells), were charged in conventional manner, separated into groups and comparison tested. All the cells tested were built with polypropylene separators and utilized 31% KOH electrolyte. The cell groups were tested in the following testing sequence:

TABLE 1

Sequence of Testing Operations

1. Charged at 10 mA for 23 hours at room temperature.
2. Discharged at 200 mA to 0.6 V cutoff.
3. Tabbed both terminals.
4. Soldered 12K ohm resistors to tabs.
5. Recharged at 10 mA for 48 hours.
6. Place cells in forced air ambient at 45° C.
7. Measured cell voltage daily.

Average and standard variations were taken for five cells from each group and the number of days during which the cells remained at 45° C. and the cell voltages were greater than 1.1 volts at the 12K ohm load was recorded.

The cells assembled with negative plates processed in accordance with the process of the Ser. No. 894,398 application had a charge retention time under such test conditions of 25.9 days while the cells assembled with the plates processed in accordance with the process of the instant invention had a charge retention time under such test condition of 27.3 days. Thus, the cells produced following the simpler, more efficient and less costly process of the instant invention had a charge retention rate at least as good and, indeed, better than that of the cells of the earlier application.

The terms and expressions which have been employed are used as terms of description and not of limitation, and there is not intention, in the use of such terms and expressions, of excluding any equivalents of the features shown and described or portions thereof, but it is recognized that various modifications are possible within the scope of the invention claimed.

What is claimed:

1. A process for the manufacture of negative electrodes for nickel-cadmium alkaline storage cells the steps consisting essentially of forming a porous nickel plaque, immersing said porous plaque in a slightly acidic cadmium nitrate solution, removing said plaque from said nitrate solution and heating said plaque in air until substantially dry, immersing said dried plaque in an alkali hydroxide solution, removing said plaque from said hydroxide solution and rinsing said plaque with water, reheating said plaque in air until substantially dry, repeating the foregoing treatments of said plaque until a desired electrochemical loading in the pores of said plaque is attained, heating said plaque with said desired electrochemical loading to a temperature not substantially less than 200° C. and not substantially more than 300° C. until substantially all of the $Cd(OH)_2$ in said plaque is converted to CdO and nitrate impurities in said plaque are converted to nitrogen oxide gases and volatized, immersing said plaque with said converted CdO in a second alkali hydroxide solution, cathodizing said plaque in said second solution until about 20-40% of the CdO therein is converted to Cd, removing the cathodized plaque from said second solution and rinsing said plaque with water and heating said plaque until said plaque is substantially dry.

2. A process, as recited in claim 1, in which said alkali hydroxide solution is sodium hydroxide.

3. A process, as recited in claim 1, in which said plaque is heated to a temperature of not substantially less than 400° C. and not substantially more than 500° C. to convert any $Ni(OH)_2$ therein to NiO after said $Cd(OH)_2$ in said plaque has been converted to CdO.

4. A process, as recited in claim 3, in which said alkali hydroxide solution is sodium hydroxide.

5. A process for removing nitrate impurity from negative electrodes for use in nickel-cadmium alkaline storage cells as such negative electrode is being formed, the steps comprising loading the pores of a porous nickel plaque with electrochemical active negative electrode material until the desired loading of such pores is attained, heating said electrochemical loaded plaque to a temperature not substantially less than 200° C. and not substantially more than 300° C. until substantially all of the $Cd(OH)_2$ in said electrochemical material is converted to Cdo and the nitrate in said material is converted to nitrogen oxide gases and volatize, immersing said plaque with said converted CdO in an alkali solution and cathodizing said plaque in said solution until not substantially less than 20% and not substantially more than 40% of the CdO therein is converted to Cd, removing the cathodized plaque from said solution and rinsing said plaque with water and heating said rinsed plaque until said plaque is substantially dry.

6. A process, as recited in claim 5, in which the temperature at which said plaque is heated to convert the $Ni(OH)_2$ to $NiO$ and converts the nitrate to nitrogen oxide gases and are driven off is increased to a temperature of not substantially less than 400° C. and not substantially more than 500° C. after said $Cd(OH)_2$ is converted to $CdO$.

7. A process, as recited in claim 6, in which said alkali hydroxide solution is sodium hydroxide.

* * * * *